Figure 4:
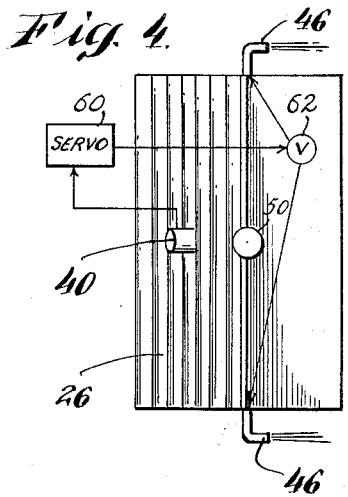

Jan. 24, 1961   C. F. TAYLOR ET AL   2,968,916
HIGH ALTITUDE POWER SUPPLY SYSTEMS
Filed July 20, 1956   2 Sheets-Sheet 1
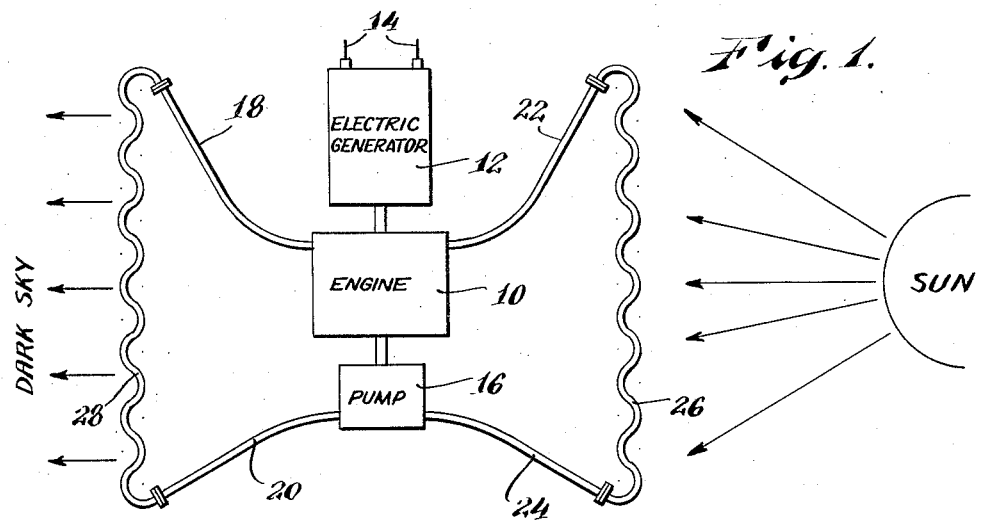
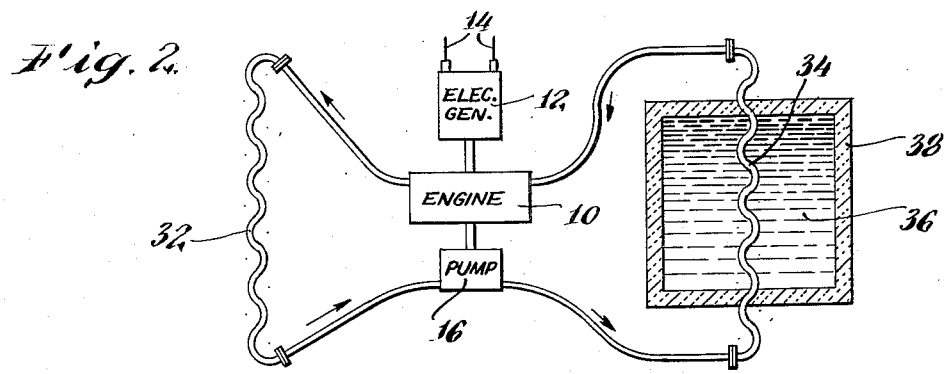
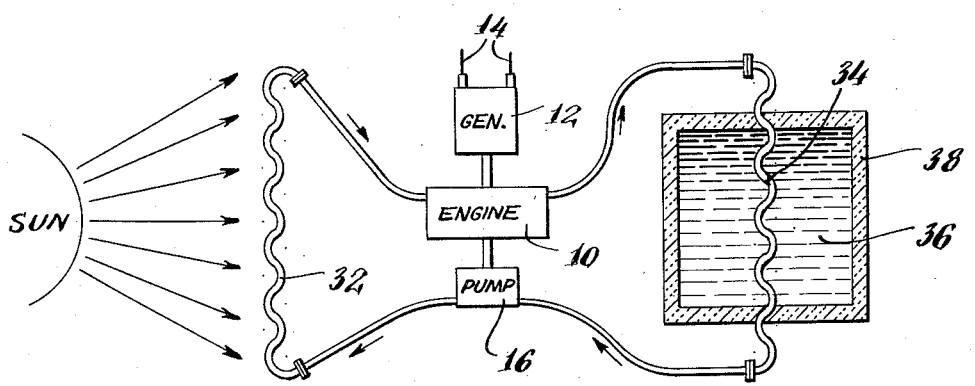
INVENTORS
James C. Livengood
C. Fayette Taylor
BY
Homer R. Montague
ATTORNEY Jan. 24, 1961    C. F. TAYLOR ET AL    2,968,916
HIGH ALTITUDE POWER SUPPLY SYSTEMS
Filed July 20, 1956    2 Sheets-Sheet 2

INVENTORS
James C. Livengood
C. Fayette Taylor
BY
Homer R. Montague
ATTORNEY

United States Patent Office 2,968,916
Patented Jan. 24, 1961

2,968,916

HIGH ALTITUDE POWER SUPPLY SYSTEMS

Charles Fayette Taylor, Brookline, and James C. Livengood, South Lincoln, Mass., assignors to Special Purpose Engine Co. Inc., Norwalk, Conn.

Filed July 20, 1956, Ser. No. 599,056

3 Claims. (Cl. 60—26)

This invention pertains to power supplies, and especially to power supplies intended for the operation of certain equipments requiring electrical energy and which equipments are to operate at very high levels in the atmosphere. A good example of equipment requiring such a power supply is the ordinary radiosonde, which includes a miniature radio transmitter used in reporting to a ground station meteorological conditions existing in the atmosphere.

The radio equipment required for such apparatus needs a source of electrical energy, such as for the energization of its vacuum tubes and other components, and in the past this has been furnished by a battery usually a dry or primary battery, carried aloft by the same balloon which supports the radiosonde itself. Difficulties arise with such a power supply, because it is essential to avoid excess weight which would limit the altitude reached by the balloon, and also because of the low temperature conditions which greatly reduce the useful output from either a primary or secondary battery.

The present invention provides a power supply which utilizes solar energy to operate a heat engine driving an electric generator to furnish the required electrical power. Energy received from the sun will be available during daylight conditions, and if night operation is also required, energy may be stored up during the daytime hours and fed to the electrical equipment at night. This storage may be accomplished either as a storage of heat in a suitable thermal reservoir, or it may be stored up in a secondary battery which will then be recharged during the next daylight cycle.

With such a power supply, the operation of a radiosonde may continue for many days, or even indefinitely if desired.

In summary, the invention utilizes a small heat engine to which thermal energy is derived from a solar receiver which operates as the "source" of the thermodynamic system. The "sink" is provided by a condenser or radiating element, and means are provided for keeping the entire assemblage oriented so that the energy receiver will be directed toward the sun during all daylight hours, while the radiator will be directed toward a portion of the sky opposite or away from the sun.

Figure 6:
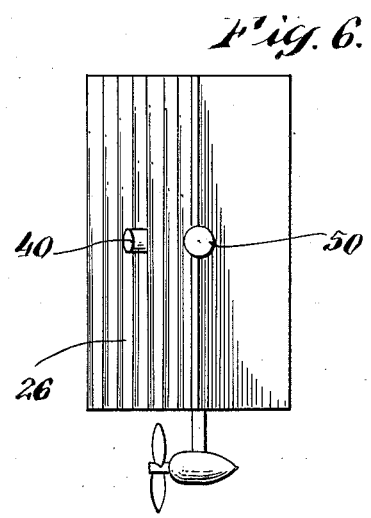
Figure 5:
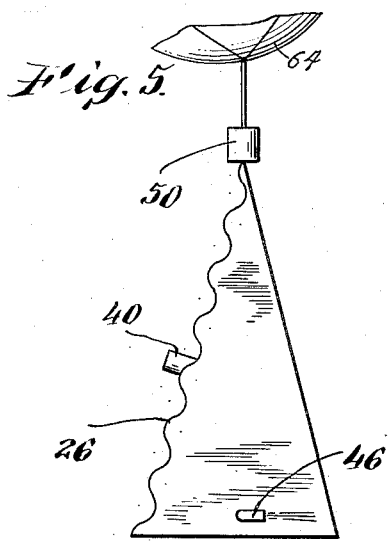
Figure 7:
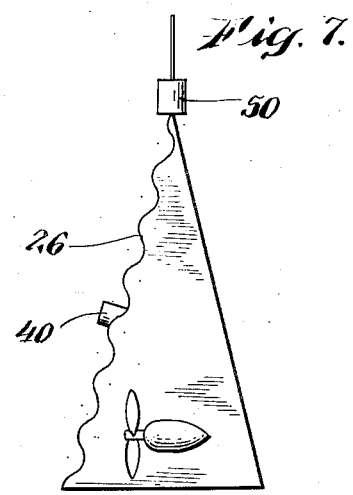
Figure 8:
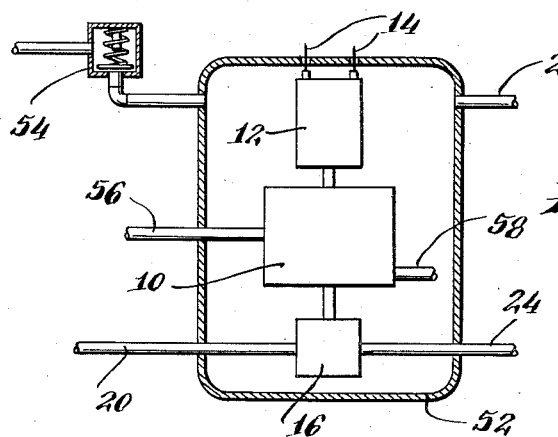

With the above objects of the invention in mind, certain preferred embodiments thereof will be described in the following specification, taken in connection with the drawings, in which:

Fig. 1 is a diagrammatic representation of a first form which the invention may take, Fig. 2 is a similar view of a modified form of the invention showing the device in night operation, Fig. 3 is a similar view of a modified form of the invention, showing the device in daytime operation, Fig. 4 is a schematic top plan view of a preferred arrangement for maintaining the proper orientation of the device with respect to the sun by means of a jet system, Fig. 5 is an end view of Fig. 4, Fig. 6 is a schematic top plan view of a preferred arrangement for maintaining the proper orientation of the device with respect to the sun by means of a propeller system, Fig. 7 is an end view of Fig. 6, Fig. 8 is a schematic illustration of an arrangement by which the power plant itself may be maintained at boiler temperature and pressure.

Referring now to Fig. 1 of the drawings, numeral 10 designates an engine, which may be for example a turbine or a reciprocating engine, and which is shown as driving an electric generator 12 having output terminals 14 to be connected to the radio or other apparatus. Numeral 16 designates a pump also driven from engine 10, the engine and pump being connected in a series circuit by ducts or conduits 18, 20, 22, and 24 leading to and from a heat absorber or boiler 26 and a condenser or a radiator 28. It will be understood that the boiler and the condenser face in different directions, so that when the boiler 26 is directed to receive radiation from the sun, the condenser 28 will be in a position to radiate energy toward an arbitrary portion of the sky away from the sun. In general, the boiler and condenser may face in directly opposite directions, and will be backed by reflective and/or insulative material so that thermal energy cannot pass between them except by way of the engine 10.

The entire system of conduits, boiler and condenser is filled with a suitable heat-exchange material, preferably a liquid which will go into a vapor phase in the usual manner of steam or similar heat engines.

The thermodynamic cycle will be apparent to those familiar with this art, the condensed liquid in the boiler 26 will be vaporized by heat received from the sun, and the vapor will pass through engine 10, driving the same, and thence will pass through conduit 18 to the condenser 28 where it will be re-condensed and the liquid returned by conduits 20 and 24 and pump 16 to the boiler 26.

Both the boiler 26 and the radiator 28 should have good radiating (absorbing) surfaces, at the areas exposed to the sun and sky respectively, and poor radiating surfaces (reflecting and/or insulating) at areas not exposed to the sun and sky. The good radiating surfaces may be blackened or otherwise treated to approach the ideal "blackbody" characteristics.

A power plant such as just described will only operate in the daytime, but can be used to charge a storage battery of sufficient capacity to give the required power at night. Suitable switching mechanism or cutout (not shown) can be provided to transfer the equipment to be powered from one source to the other during the changeover period. In such a case, it will be understood that the power plant will have sufficient capacity to carry the daytime load while simultaneously recharging the battery for the next night.

The mechanism by which boiler 26 is kept pointed at the sun during daylight hours will be described herein below.

A modified form of the invention, in which the power plant will operate as such both day and night, is illustrated in Fig. 2 of the drawings. This device will be non-operative only for a short period near dawn and again at dusk. The numerals 10, 12, 14, and 16 again designate the engine, generator, terminals and feed pump as in Fig. 1. Now, however, a single combined boiler and condenser 32 is provided, connected as before between the engine and pump. This element 32 is directed toward the sun during daylight hours (Fig. 3) by a mechanism to be described, and acts as a boiler, feeding vapor to engine 10 and thence to a heat exchanger 34 surrounded by a body of material 36 such as a phase-change liquid which melts or freezes in response to the heat supplied thereto or withdrawn therefrom. This material 36 is contained within an insulated container 38, the whole operating as a thermal reservoir.

For night operation (Fig. 2), the temperature of the liquid-solid mixture 36 is higher than that of the surface 32 exposed to the sky, and hence flow will be in the direction shown by arrows in Fig. 2. The liquid-solid mixture 36 will give up heat to the surface 32 and more liquid will freeze as heat is given up.

For daytime operation (Fig. 3), the medium in the radiator system moves in the direction of the arrows shown in Fig. 3. The exposed surface of the boiler 32 will be oriented toward the sun. This surface will then be hotter than the liquid-solid mixture 36 which will receive heat by melting of the solid portion. A suitable automatic temperature control will reverse the 3-way valves and flow will be in the direction shown. Alternatively, the power plant will simply rotate in a direction opposite to the direction of rotation at night.

Figs. 4 and 5 show a suitable mechanism for maintaining the boiler of either of the foregoing devices oriented toward the sun. In these figures, numeral 40 designates a pair of photo-cells or other light or heat sensitive devices aimed in the same direction as the boiler, and connected through a servo-mechanism 60 which in turn controls a valve 62 which distributes air or other fluid under pressure to one of two discharge jets 46 aimed in opposite directions with respect to the swivel 50 by which the power plant is suspended from the balloon 64. In accordance with well known principles of servo-mechanisms, any movement of the boiler away from the sun's direction will cause the appropriate jet to discharge fluid to rotate the device in the direction needed to correct the deviation from the desired orientation. Obviously, a pair of air screws or a reversible air screw, as shown in Figs. 6 and 7, directed tangentially to the swivel could equally well be employed in place of the jets described. Also, the power for the jets or propeller may be obtained either from the engine, the feed-pump, or from a storage battery if such is provided.

A further possibility with respect to maintaining proper orientation is to utilize a pair of thermal couples or the like which will sense the temperatures of the boiler and the opposite surface of the apparatus. Suitable servo-mechanism can then energize the jets or propellers to maintain a maximum temperature difference between the thermal couples.

Fig. 8 illustrates an apparatus of the above type in which the engine, generator and pump are enclosed within a single insulated container 52 to insulate these parts against the low ambient temperatures occurring at high altitudes. A spring-loaded valve 54 serves as safety valve and to permit starting, and it will be seen that vapor from boiler merely enters the container 52 and ultimately finds its way into engine inlet 58 and thence to the condenser via conduit 56. In other respects Fig. 8 is the same as the forms earlier described herein.

While the invention has been disclosed in accordance with the Patent Statutes in the form of certain specific embodiments, it is to be understood that many modifications may be made by those skilled in the art without departing from the spirit of the invention as defined in the appended claims.

What is claimed is:

1. The combination with airborne apparatus for utilizing the sun's radiation as a source of heat energy for purposes of developing power at high altitudes, including a heat collector and a heat engine connected for operation from said collector, a carrier lacking directional control in travel, and means supporting said collector and said engine from said carrier; of means energized by the output of said heat engine for bodily orienting said heat collector in a direction facing the sun; said last-named means including radiant energy sensing means, means for rotating the heat collector in space, and means for controlling the rotation of the latter from said sensing means.

2. The combination of claim 1, in which said rotating means comprises at least one reaction jet.

3. The combination of claim 1, in which said rotating means comprises at least one air screw.

References Cited in the file of this patent

UNITED STATES PATENTS

| | | |
|---|---|---|
| 496,959 | Severy | May 9, 1893 |
| 784,005 | Ketchum | Feb. 28, 1905 |
| 1,683,266 | Shipman | Sept. 4, 1928 |
| 1,765,136 | Drane | June 17, 1930 |
| 1,989,999 | Niederle | Feb. 5, 1935 |
| 2,636,129 | Agnew | Apr. 21, 1953 |

OTHER REFERENCES

German publication, "Wege Zur Raumschiffahrt," by Hermann Oberth, 1894 (pages 413–415).